Aug. 13, 1935. C. B. ROEDE 2,011,418
RAIL FLAW DETECTOR CAR
Filed March 17, 1934 2 Sheets-Sheet 1

Inventor
Charles B. Roede
By Joseph H. Lipschutz
Attorney

Aug. 13, 1935.  C. B. ROEDE  2,011,418
RAIL FLAW DETECTOR CAR
Filed March 17, 1934   2 Sheets-Sheet 2

Inventor
Charles B. Roede
By Joseph H. Lipschutz
Attorney

P

Patented Aug. 13, 1935

2,011,418

UNITED STATES PATENT OFFICE 2,011,418

RAIL FLAW DETECTOR CAR

Charles B. Roede, Jersey City, N. J., assignor to Sperry Products, Inc., Brooklyn, N. Y., a corporation of New York Application March 17, 1934, Serial No. 716,096

9 Claims. (Cl. 246—200)

This invention relates to rail flaw detector cars adapted to travel on railroad tracks and detect fissures inside the rails. More particularly, the invention relates to the Sperry rail flaw detector car wherein a detector mechanism is suspended from each side of the car to cooperate with the respective rail. Such suspended mechanisms are normally biased outwardly against the gauge side of the rail and it has been found that on approaching a frog mechanism which is supported on a carriage riding on the rail sometimes tended to enter the turnout track of the frog when the car itself was travelling on the main track. This caused derailment and in some instances complete destruction of the carriage supporting the detector mechanism.

It is the principal object of my invention, therefore, to provide a device which will permit the flaw detector mechanisms to pass frogs safely without passing to the wrong side of the facing point of the frog, which would tend to derail and even destroy the detector mechanism.

Further objects and advantages of this invention will become apparent in the following detailed description thereof.

In the accompanying drawings.

Figure 1:
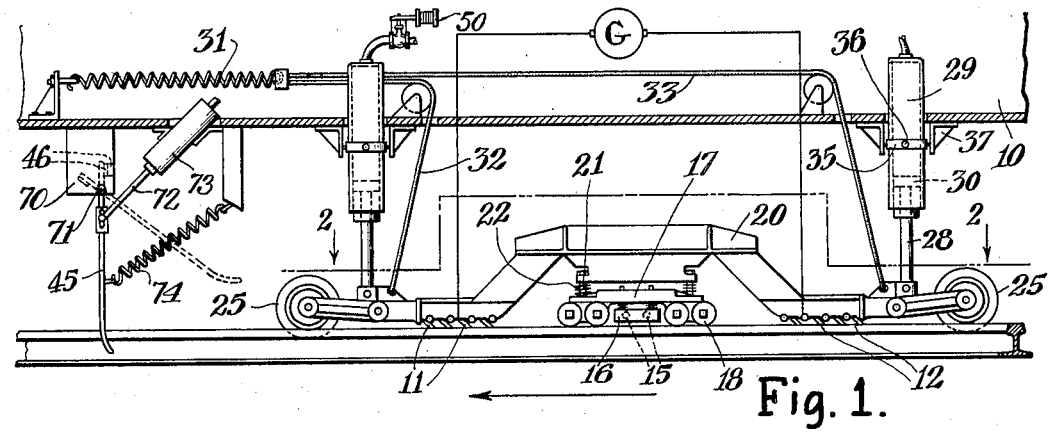
Fig. 1 is a side elevation of a portion of a Sperry rail flaw detector car having my invention applied thereto.
Figure 2:
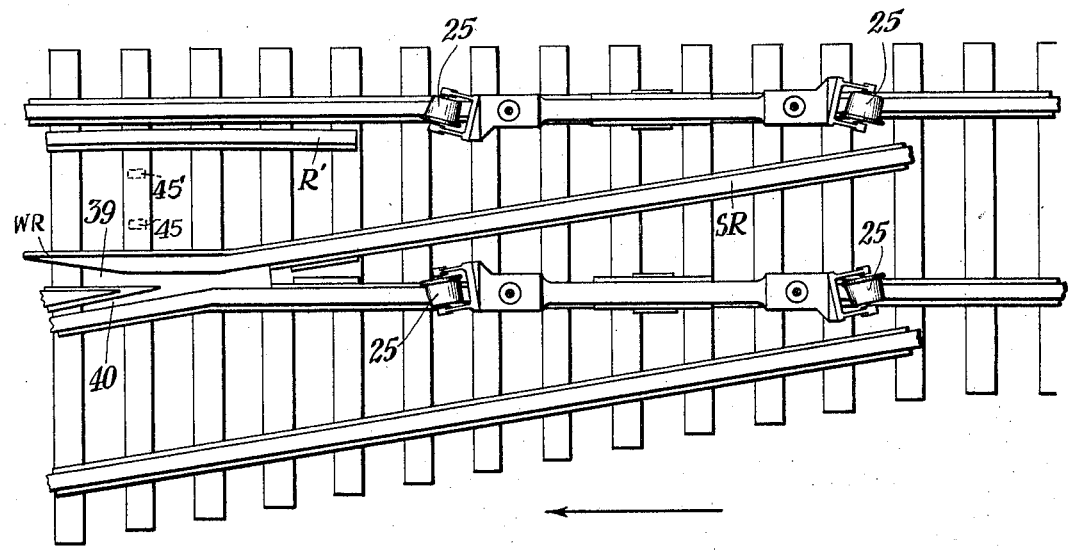
Fig. 2 is a section taken substantially on the line 2—2 of Fig. 1 and showing the necessity for my invention.

Referring to the drawings, there is disclosed in Fig. 1 the Sperry rail flaw detector mechanism as applied to a Sperry rail flaw detector car. A portion of the car body 10 is disclosed, within which is supported a generator G for supplying current to the rail by means of sets of brushes 11 and 12 to establish an electro-magnetic field surrounding the rail. The flux in said field will be uniform as long as there are no flaws therein, but when a flaw is present the flux in said field is distorted. Such distortion of the field is detected by means of a pair of induction coils 15 spaced in tandem along the rail. Said coils are of equal inductance and oppositely wound so that normally as the car travels along the rail they cut a constant and equal number of lines of force. On entering a region of flaw, one coil will cut a different number of lines of force from the other to generate a differential E. M. F. which, after being suitably amplified, may be caused to operate any suitable indicator such as a recorder. The said coils are mounted in a housing 16 carried by a detector carriage 17 adapted to ride on the rail by means such as wheels 18. Said detector carriage is in turn supported on a current brush carriage 20 by means of loosely fitting bolts 21 and springs 22 which permits the detector carriage 17 to move independently of carriage 20 and to adjust itself to irregularities in the rail surface. The current brush carriage 20 supports the current brushes 11 and 12 and may be supported on the rail by means of wheels 25, which wheels are toed outwardly as shown in Fig. 2 so as normally to bias the current brush carriage outwardly into firm engagement with the gauge side of the rail. The current brush carriage 20 is supported on the car body by means of piston rods 28 connected to pistons 30 operating in fluid pressure cylinders 29 mounted in a cardan suspension 35, 36, 37 which permits the carriage 20 to swing laterally with respect to the rail. The current brush carriage 20 is normally held in raised position by means of retractile springs 31 and cables 32, 33, but when it is desired to lower the carriage into engagement with the rail, fluid pressure, such as compressed air, is admitted to the cylinders 29 to depress the pistons 30 and thus lower the carriage against the action of the retractile springs.

The mechanism shown in Fig. 1 is duplicated at each side of the track so that one of said mechanisms coacts with the respective rail. By referring to Fig. 2 it will be seen that since each of these mechanisms are supported independent of each other when said detector car travels in the direction of the arrow shown in Fig. 2, then on approaching a frog there would be a tendency, because of the fact that each carriage is biased outwardly against the gauge side of the rail as described above, for said wheels 25 to enter the turnout side 40 of the frog. Since the car itself travels along the undeviating, or main, portion of the track on the side 39 of the frog, the carriage 20 would be moved outwardly to cause eventual derailment, and, as has been the case in several instances heretofore, complete destruction of the said carriage.

To remedy the above difficulty I provide mechanism whereby the current brush carriage on the frog side of the track may be raised as said carriage approaches the frog. My invention may be embodied in several different forms, which are disclosed in Figs. 3, 4 and 5.

Figure 3:
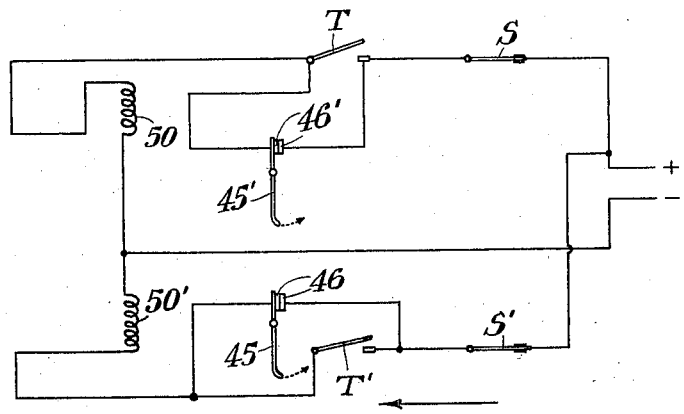
Fig. 3 is a wiring diagram embodying one form of my invention.

Referring first to the form shown in Fig. 3, I have disclosed means whereby the said current brush carriage may be raised either by the operator or automatically on approaching a frog. Such raising is effected by operating the valve which cuts off the supply of fluid pressure to cylinders 29 thereby permitting the retractile springs 31 to raise the carriage. The air valves at the respective sides are controlled by means of valve-operating electromagnets 50, 50'. The circuit through each of said electromagnets may be controlled either solely by the operator who operates the switch S, S' (one for each carriage) or semi-automatically by the operator and the approach of the carriage to the frog. The control by the operator comprises the switch S or S' through the electromagnets 50, 50'. Upon opening the switch the respective electromagnet is deenergized to cut off the air supply and permit the carriage on the respective side to be raised. When the frog has been passed over, the switch S or S' is closed and the air supply again lowers the carriage on that side.

For semi-automatic operation of the electromagnets 50, 50' there may be provided on the car body a pivoted finger 45 which is mounted in the path of switch rail SR and wing rail WR, so that it will engage one or the other of said rails when the car is travelling in either direction. Finger 45 may be pivoted on bracket 70 at 71 and may be actuated toward effective position into the path of the switch rail by means such as lever 72 pivoted thereto and actuated from a compressed air cylinder 73 against the action of retractile spring 74 which normally tends to swing finger 45 to ineffective position out of the path of the switch rail. When a frog is approached the operator opens switch T or T', but this does not deenergize electromagnets 50, 50'. The circuit through electromagnets 50, 50' is closed through contacts 46, 46'. The pivoted finger 45 or 45', on engagement with the switch rail or wing rail opens one set of contacts 46 or 46' to deenergize electromagnets 50 or 50'. When it is desired to change from semi-automatic operation to operation solely by hand, switches T and T' are closed.

Figure 4:
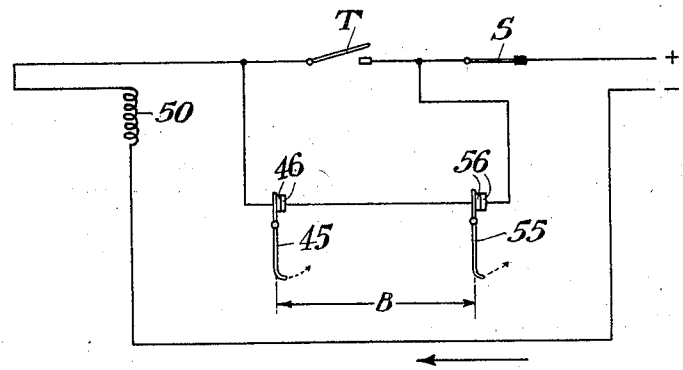
Fig. 4 is a wiring diagram disclosing a modified form of my invention.

In Fig. 4, I have disclosed a modified form of my invention which is designed to prevent lowering of the carriage until a frog has been completely passed over. During semi-automatic operation, that is, where the switch S is closed and the switch T open so that the device is controlled jointly by the operator and by the fingers 45, 45', as soon as said finger 45, for instance, has passed beyond the switch rail the carriage would be lowered. It will be understood that the finger 45 is, as shown in Fig. 1, positioned in advance of the detector mechanism and it may be that when finger 45 has left the switch rail the current brush carriage has not yet passed beyond the face point of the frog. For this purpose I may provide an additional finger 55 corresponding to finger 45, said additional finger being positioned in line with finger 45. The device shown in Fig. 4 is duplicated for the carriage at the other side. The finger 55 is positioned to the rear of finger 45 a certain distance B such that when finger 45 has left the switch rail, finger 55 will still be on the rail. Thus, there is an overlapping operation because the said finger 55 controls a set of contacts 56 which is in series with the set of contacts 46, so that if either set is opened the electromagnet 50 is deenergized.

Figure 5:
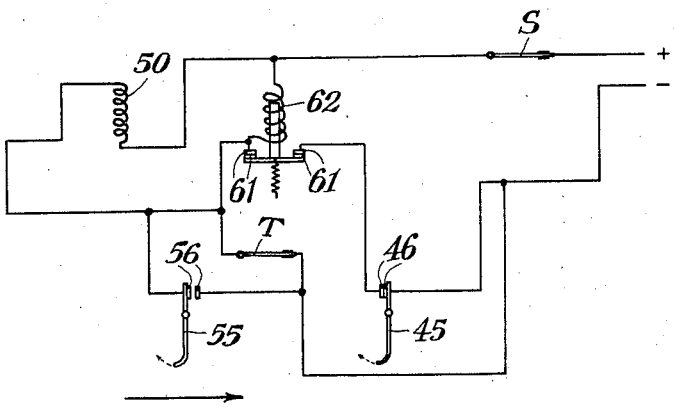
Fig. 5 is a wiring diagram disclosing still another form of my invention.

A somewhat different method of operation is disclosed in Fig. 5. In this form I provide for two projecting fingers 45, 55, as in Fig. 4, with a similar set at the other side. The first finger, upon engagement with the switch rail, is designed to effect raising of the current brush carriage and said carriage is designed to remain in elevated position until the second finger, upon engagement with the switch rail, causes the same to be lowered. It will be seen that this differs from the Fig. 4 form of the invention wherein both fingers operate to cause the carriage to remain raised. The spacing of the fingers in the Fig. 5 form will, of course, be different from that in the Fig. 4 form. To effect this operation, I provide a circuit wherein switch S and switch T are normally closed. This energizes electromagnet 50 to lower the carriage and energizes relay 62 to close contacts 61. When a frog is approached, the operator opens switch T but this does not deenergize electromagnet 50 which has a return circuit through contacts 61 and 46. When finger 45 engages the switch rail this deenergizes electromagnet 50 by opening contacts 46 to cause the carriage to be lifted. Deenergization of electromagnet 50 deenergizes coil 62 to open contacts 61. When contacts 46 are made again this does not energize electromagnet 50 because switch T and contacts 61 are both open. Before finger 55 strikes the switch rail the operator closes switch T. When finger 55 strikes the switch rail, the electromagnet 50 is again energized because the circuit therethrough is completed from the negative side of the line through contacts 56, electromagnet 50 to the positive side of the line, and at the same time relay 62 is energized in the parallel circuit from the negative side of the line, through switch T, relay 62, to the positive side. Contacts 61 are thus closed, and, contacts 45 having reclosed, electromagnet 50 is retained energized. The device is ready for semi-automatic operation at the next frog when the operator again opens switch T.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising means adapted to engage a portion of said frog, and means whereby said carriage-raising means is rendered effective by the engagement of said engaging means with said frog portion.

2. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising means adapted to engage the switch rail of said frog, and means whereby said carriage-raising means is rendered effective by the engagement of said engaging means with said switch rail.

3. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising a member pivoted on said car and extending downwardly into the path of the switch rail of said frog, and means whereby said carriage-raising means is rendered effective by the engagement of said member with said switch rail.

4. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising a member pivoted on said car and extending downwardly into the path of the switch rail of said frog, means whereby said carriage-raising means is rendered effective by the engagement of said member with said switch rail, and means whereby said member may be operated to effective and ineffective positions into and out of the path of the switch rail.

5. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising a plurality of means adapted to engage the switch rail of said frog successively, and means whereby said carriage raising means is rendered effective by the engagement of each of said engaging means with said switch rail.

6. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising a plurality of means adapted to engage the switch rail of said frog successively, means whereby said carriage raising means is rendered effective by the engagement of the first of said engaging means with said switch rail, means for maintaining said carriage in raised position, and means whereby said maintaining means is rendered ineffective and said carriage lowering means is rendered effective by the engagement of the succeeding engaging means with said switch rail.

7. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising means adapted to engage the switch rail of said frog, control means adapted to be operated by an operator, and means whereby the actuation of said control means and the engagement of said engaging means with said switch rail conjointly render said carriage-raising means effective.

8. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising a plurality of means adapted to engage the switch rail of said frog, control means adapted to be operated by an operator and means whereby the actuation of said control means and the engagement of each of said engaging means with the switch rail conjointly renders said carriage-raising means effective.

9. The combination of a rail flaw detector car having a carriage, said carriage supporting flaw detector mechanism and having wheels adapted to engage the rail, means for raising said carriage to ineffective position, and means for lowering said carriage to effective position, of means for preventing said carriage from entering the turnout of a frog when said car is on the main track, said last-named means comprising a plurality of means adapted to engage the switch rail of said frog, control means adapted to be operated by an operator and means whereby the actuation of said control means and the engagement of the first of said engaging means with the switch rail conjointly renders said carriage-raising means effective, means for maintaining said carriage in raised position and means whereby said maintaining means is rendered ineffective and said carriage-lowering means is rendered effective by the engagement of the succeeding engaging means with said switch rail.

CHARLES B. ROEDE.